United States Patent [11] 3,575,058

| [72] | Inventor | Charles E. Kraus |
| | | Allendale, N.J. |
| [21] | Appl. No. | 753,941 |
| [22] | Filed | Aug. 20, 1968 |
| [45] | Patented | Apr. 13, 1971 |
| [73] | Assignee | Excelermatic, Inc. |
| | | Continuation-in-part of application Ser. No. |
| | | 499,560, Oct. 21, 1965. |

[54] MOTION TRANSMISSION DRIVE
18 Claims, 17 Drawing Figs.

[52] U.S. Cl. .................................................. 74/227,
74/230.17, 74/236, 74/242.11
[51] Int. Cl. ....................................................... F16h 7/12,
F16h 55/56, F16g 1/24
[50] Field of Search .......................................... 74/226,
227, 242.8, 242.11, 230.17, 236

[56] References Cited
UNITED STATES PATENTS

| 976,115 | 11/1910 | Bard .............................. | 74/242.11 |
| 1,871,268 | 8/1932 | Hildebrand ................... | 74/226X |
| 1,911,184 | 5/1933 | Flynn ........................... | 74/230.17X |
| 2,154,648 | 4/1939 | Weston ......................... | 74/236 |
| 2,766,417 | 10/1956 | Merritt ......................... | 74/242.8X |
| 3,136,169 | 6/1964 | Karger et al. ................. | 74/230.17 |

Primary Examiner—James A. Wong
Attorneys—Theodore L. Bowes and Maurice W. Ryan

ABSTRACT: A power transmission device having a pair of pulleys connected by a traction transmitting member such as a chain, such chain being of sufficient length to provide intentionally a certain amount of sag between the pulleys with control of both slack and tight side chain pull and control of maximum ratio of tight to slack pull. Continuous tension on both tight and slack sides of the member is applied to provide for adequate wrap of the member around the pulley. The pulleys may be of variable pitch type to provide for adjustable speed operation under suitable control.

The chain has longitudinally extending contact surfaces engaging the pulley flanges which lie along the centerline of the chain, are essentially flat, match the pulley flange surfaces, and are positioned between the joints of the chain links.

Patented April 13, 1971  3,575,058

Patented April 13, 1971
3,575,058
5 Sheets-Sheet 3
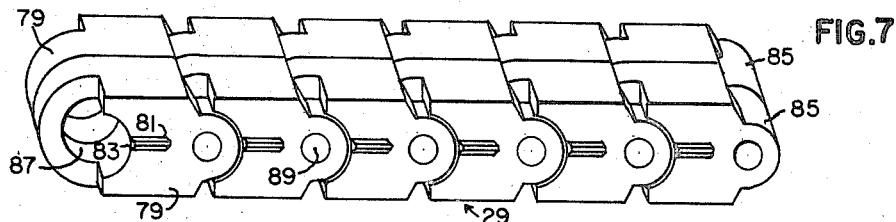
FIG.7
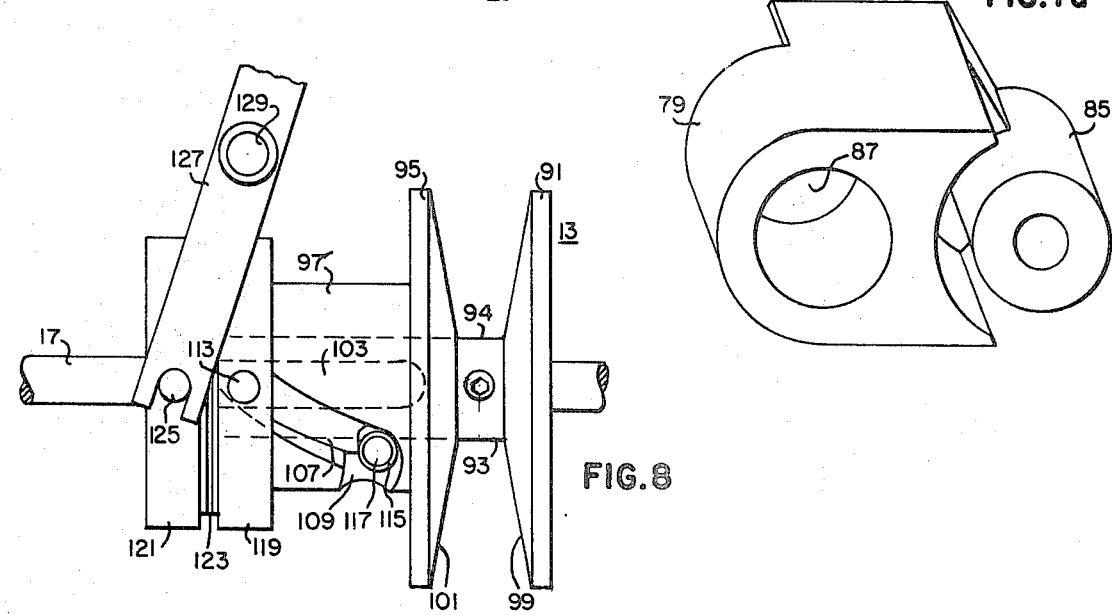
FIG.7a
FIG.8
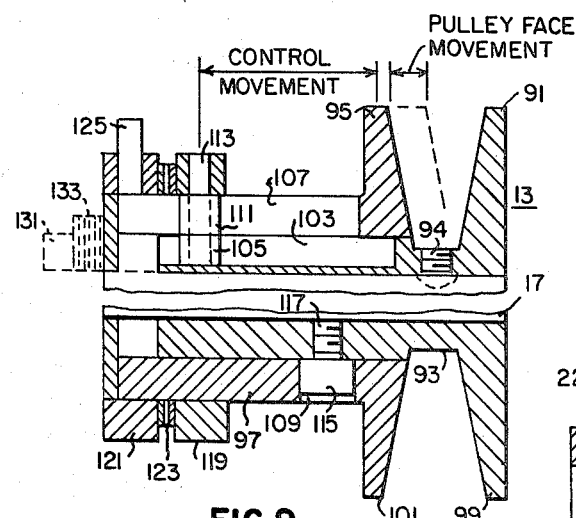
FIG.9
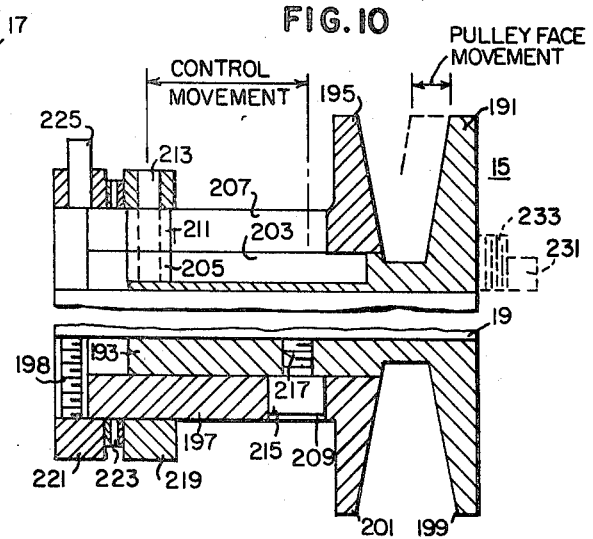
FIG.10

Patented April 13, 1971  3,575,058

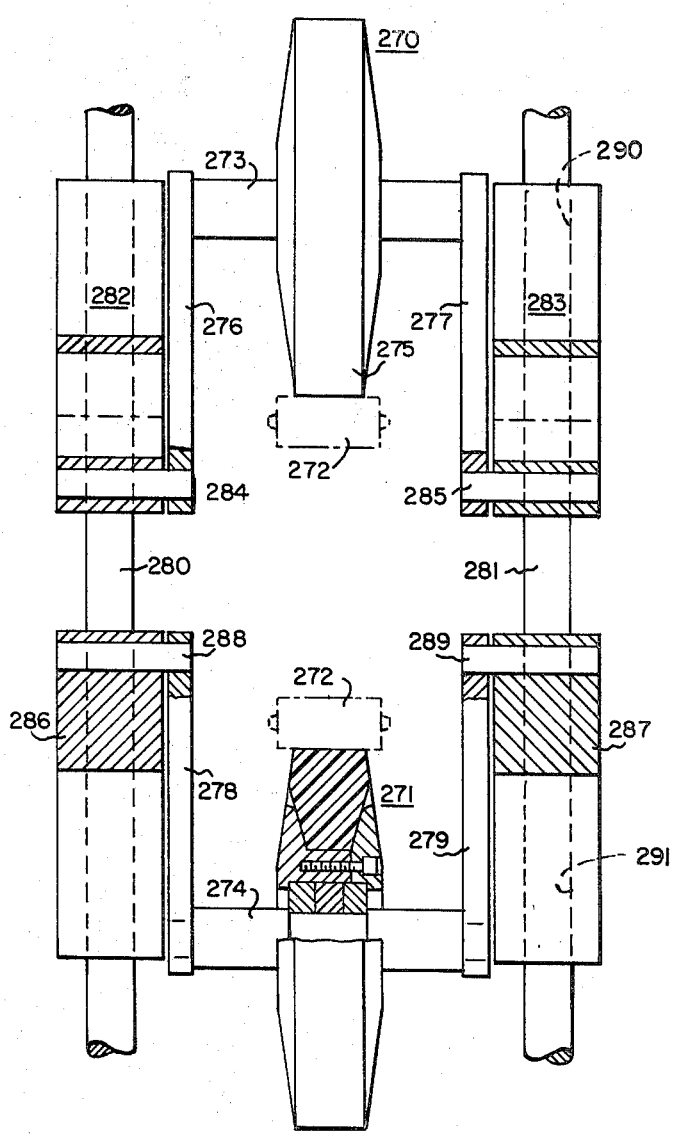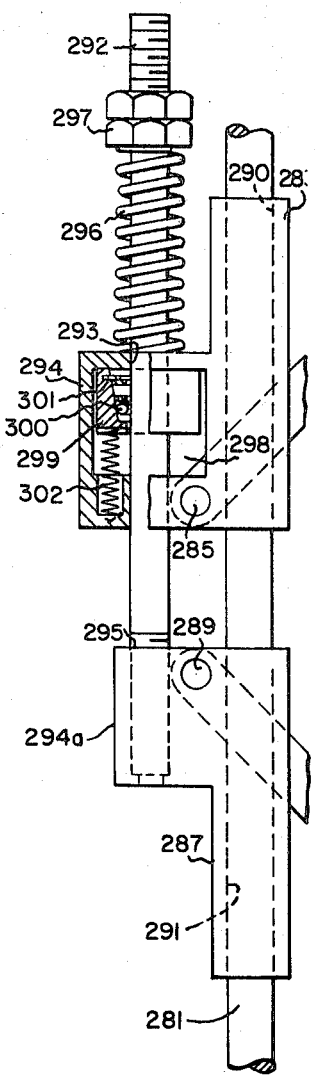

MOTION TRANSMISSION DRIVE

This is a continuation-in-part of the invention disclosed and claimed in my application Ser. No. 499,560 filed Oct. 21, 1965 and assigned to the same assignee as the present invention.

BACKGROUND OF THE INVENTION

Most mechanically adjustable speed drives which operate on traction principles involve the use of V-belts and pulleys with changeable pitch. Despite improved belt materials and careful design, V-belt drives remain prone to fairly rapid wear and, more critically, to failure on overloads. Rolling traction drives have been used with some success in applications where V-belt drives would normally be used but these drives, in which hard steel contacts or rolls against hard steel in oil, are expensive by comparison with available V-belt drives and are thus not widely used.

OBJECTS OF THE INVENTION

It is an object of this invention to provide a compact traction drive wherein contact size and forces are controlled to assure a workable coefficient of traction under all load conditions.

It is a further object to provide a simple, compact all metal variable speed chain traction drive competitive in cost to nonmetallic adjustable speed belt drives.

It is a further object of this invention to provide a simple and compact traction drive with assured control over traction contact forces and thus provide a workable traction coefficient at all times during drive operation.

A still further object of the invention is to provide a variable speed traction drive having tensioning means which not only maintains optimum pulley wrap at all speed ratios and loads, but also provides necessary chain slack side tension at all times and adjusts automatically to compensate for chain wear.

A further object of this invention is to provide tensioning means for traction drives so designed that practically no stress is transmitted to tensioning means supports or housing associated therewith.

Another object of the invention is to use novel tensioning apparatus to control contact spin forces in drives as the motion transmitting member, such as a chain, engages and disengages the pulley flange surfaces.

Another object is to provide an adjustable speed drive having essential slack side tension at all speed ratios and loads without excessive tensions.

A still further object of the present invention is to provide a novel chain for traction drives. The chain is particularly well adapted to function cooperatively with adjustable pitch pulleys and with tensioning means.

Another object of the invention, with regard to the traction chain, is to provide a chain link design with optimum tensile strength and pivot area for a given pulley pitch, and which assures velocity equalization of the chain's contact points with the pulley's contact points.

Another object is to provide a metallic chain link which does not require grinding after hardening but which has contact areas which can be roll formed to proper contact angle and uniformity after assembly.

It is a further object to provide chain links providing a substantially continuous smooth surface after assembly.

It is a still further object of this invention to provide a chain traction drive in which the contact angle of pulley face contact point to chain contact point is the same for all ratio positions throughout the variable speed range of the drive.

It is a further object of the invention to provide in a traction chain drive, novel pulley structures which coact with the traction chain and the chain tensioning means to provide smooth uniformity of operation over the entire speed range of the drive.

Another object of the invention is to provide control for varying the pitch of pulleys in variable speed traction chain drives, which control means effects force balances practically completely within the pulley structures and thus avoids imposing heavy thrust loads on pulley shaft bearings.

Still another object of the invention is to provide pulley pitch variation control whereby a single control action effects differential control movements as between a chain-connected pair of pulleys and thus meets conditions throughout the operating range for constant chain length operation.

With the foregoing and other objects in view, which will become apparent in the course of the ensuing disclosure, the invention will now be described with greater particularity and with reference to the drawings wherein:

BRIEF DESCRIPTION OF THE DRAWINGS

FIG. 7 is an isometric drawing of a chain used for traction transmission in the present invention;

FIG. 7a is an enlarged isometric view of a link of the chain shown in FIG. 7;

FIG. 8 is a detail view of an adjustable pitch pulley and its associated control according to the present invention;

FIG. 9 is a section through the pulley and control of FIG. 8;

FIG. 10 is a section like FIG. 9 but showing an alternative embodiment of adjustable pitch pulley used in conjunction with the pulley of FIGS. 8 and 9;

FIGS. 15 and 16 illustrate a second embodiment of tensioning means for use in the invention

GENERAL DESCRIPTION

Figure 1:
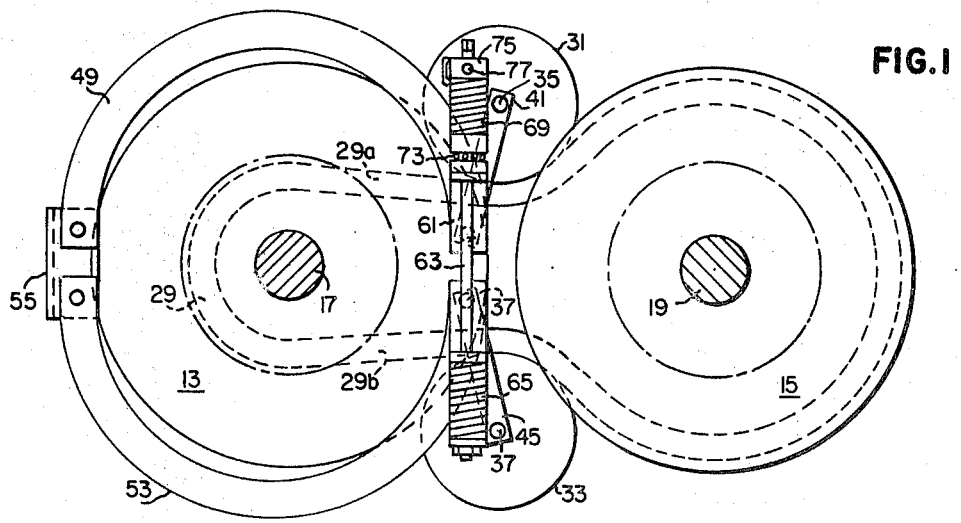
FIGS. 1 and 1a disclose a schematic arrangement of a mechanical drive according to the present invention.
Figure 1A:
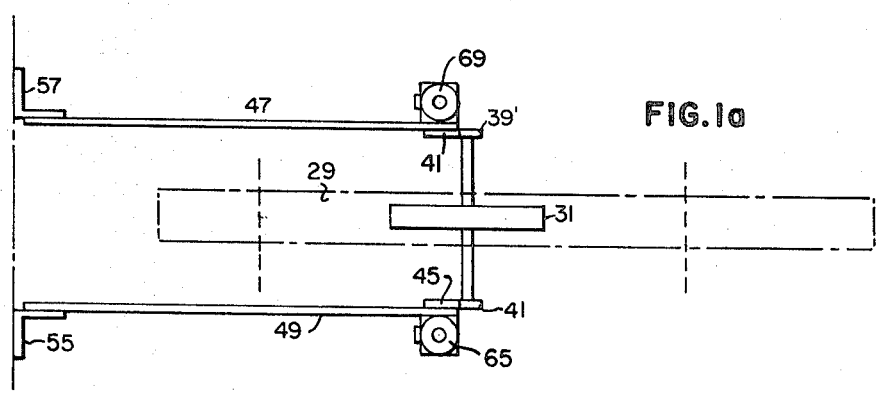

Referring to FIG. 1, there are shown the principal elements of a power transmission device constructed according to the principles of my invention. There is provided an input shaft 17 and an output shaft 19 in parallel relationship. Pulleys 13 and 15 are mounted on shafts 17 and 19 respectively, and an endless traction transmitting member 29 connects or passes around the pulleys.

The length of member 29 is such that a predetermined amount of sag is provided between the pulleys under no load conditions, as, for example, one inch between each set of pulleys. In order to provide operating tension on both the tight side 29a and the slack side 29b of member 29 under load conditions, there is provided a pair of members, such as rollers 31 and 33, carried by pairs of arms 47, 49 and 51, 53 and biased toward each other by suitable biasing or tension assemblies including springs 69 and 65, respectively, whereby the rollers engage the member 29. The biasing units may be mounted by means of curved arms to avoid contact with pulley 13. This arrangement will be more fully explained below. Arms 49, 53 are attached to tension assemblies at points 7, 7a.

The rollers are positioned intermediate the pulleys and are of sufficient diameter relative to the length of member 29 to maximize the wrap of member 29 about each pulley, where wrap is the included angle of pulley in contact with member 29. In the arrangement of FIG. 1, the wrap angle at pulley 13 is about 180° and that at pulley 15 is substantially greater than 180°. Thus, there is provided a minimum wrap of 180° on each pulley.

As indicated above, one reason for maintaining and controlling the force exerted on the outer surface of member 29 by rollers 31, 33 approximately midway between the pulley-member contact points is to maintain greater wrap on the pulleys than would be had with a member stretched between the pulleys.

Figure 2:
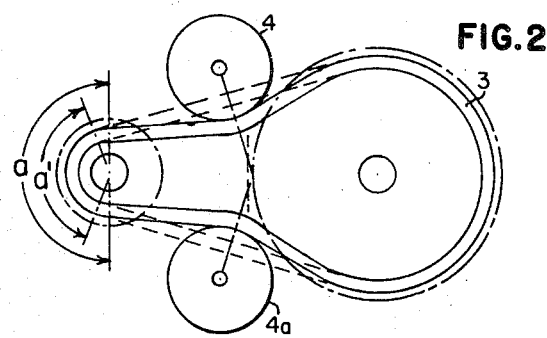
FIGS. 2 and 3 are skeleton views useful in understanding the invention.

Referring to FIG. 2, it is seen that angle $a$, is about 180° and is substantially greater than angle $a'$ representing wrap in connection with a taut member or belt drive as suggested by the dashed lines. A large wrap angle is advantageous because it reduces slack side tension requirements and increases the contact between the transmission member and the adjacent pulley face or flange.

Figure 3:
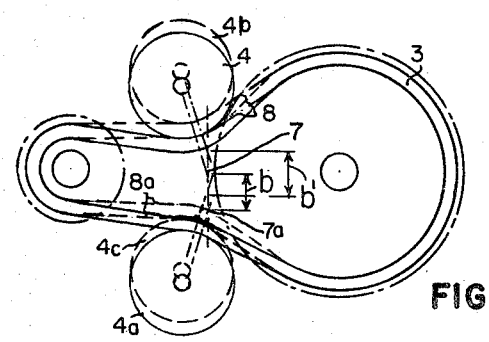

A second reason for using biased tension means will appear from a description of the effect of load on the transmission member and is illustrated in FIG. 3. When the drive is loaded, the pull on member 3 tends to straighten it out as shown by dashed lines 8 and the roller 4 is moved outward against the bias as to the dashed line position 4b. Roller 4a on the slack side moves inwardly because of the increased slack to a new position, 4c. The amount of movement of the rollers is a function of the amount of slack and the distance between pulley centers. The movement of the rollers because of the increased load results in compressing spring 65 so that the force exerted by the rollers on the surface of member 29 is increased. This action is shown in FIG. 3. Under no load conditions pivot points 7, 7a are separated a distance $b$. Under the loading condition assumed, the pivot points are now separated a distance $b'$ which is appreciably greater than $b$. In order to maintain the same slack side tension as more slack accumulates, more roller force is required as the angle of the chain pulling against the roller force is increased. It is possible to control the slack side tension by choice of design and selection of spring rates. The maximum separation of rollers 4, 4a is reached when spring 65 goes solid.

The tension can be maintained constant or increased if desired giving a control of the ratio of slack side pull $Ps$ to tight side pull $Pt$ under all load conditions. This is important because slack side tension in excess of requirements adds pull on both sides of the transmission member, increases bearing requirements, and adds to wear of the transmission member. If the member is a link chain, this wear occurs at the chain pivots. It also increases unnecessarily the contact forces.

Figure 4:
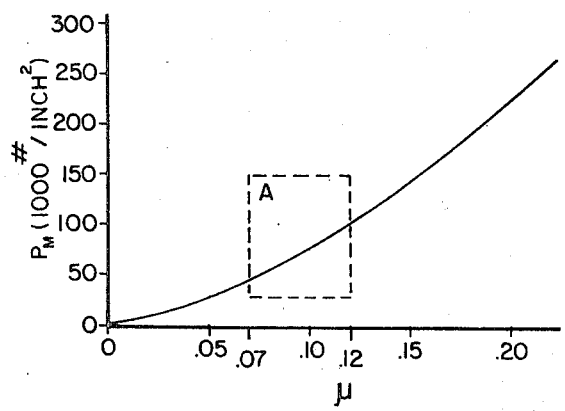
FIG. 4 is a chart helpful in understanding the present invention.

In FIG. 4, there is illustrated the relation of the coefficient of traction $\mu$ to contact loading $Pm$. The contact force and therefore the $Pm$ value is a function of the chain pull at the contact points. The $Pm$ on the slack side may be only one-quarter or a third of the $Pm$ at the tight side and varies from one value to the other on the contacts inbetween. The $\mu$ value on the slack side may be so low it is outside of the area shown but it also is so low as to be of no great help in carrying the torque load. In other words, the area A should be considered a composite of $Pm$ and $\mu$ values from all contacts. $Pm$ values above 150,000 p.s.i., while tolerable for overload, would cause surface wear. The chain contact is not like a rolling traction contact where the traction element has time to squeeze out oil and metal to metal contact is involved. Some contacts must definitely be above the graph line for a given design $\mu$ if safe operation is to be expected. The ratio of $Pt$ to $Ps$, of course, determines the safe value of $\mu$, a lower ratio being used for lower $\mu$ values, but low $Pt/Ps$ values also increase slack side $Pm$ values and help concentrate all values into a smaller area. Our present testing indicates a value of about 4 is desirable. The importance of this relationship will appear more fully in connection with the following detained description.

DETAILED DESCRIPTION

Referring to FIG. 1, it is noted that the forces exerted on the rollers by the springs are applied approximately at the point of roller pivots and the curved arms 49, 53 are subject only to a small side component of force in the pulley ratio position. This component disappears at a 1:1 ratio. Thus, means has been provided independently of any housing which may be added to contain the drive.

Figure 5:
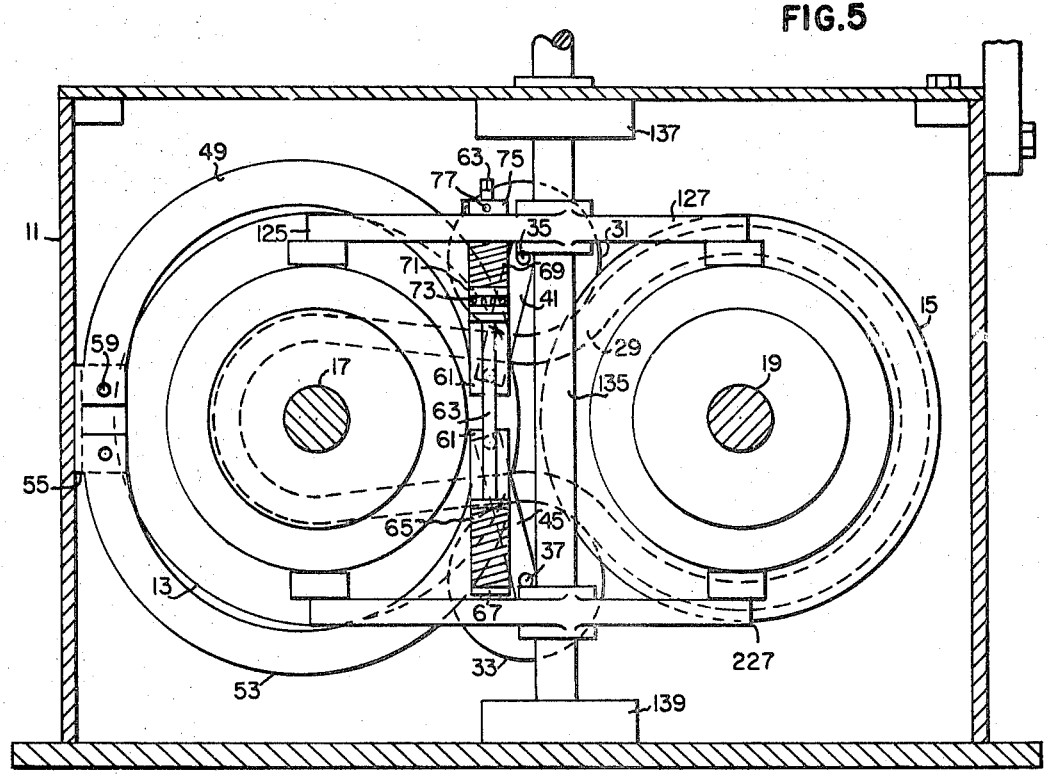
FIG. 5 is a sectional view through a drive according to the present invention.

With reference to FIG. 5 et seq of the drawings, there is disclosed a specific embodiment of apparatus according to the present invention which may comprise a housing 11 in which is mounted a drive pulley 13 and a driven pulley 15, respectively, on drive shaft 17 and driven shaft 19. Shafts 17 and 19 are of course the input and output shafts of the drive for any particular operation, but the apparatus may be driven in either direction, that is to say, input and output may be interchangeable. The shafts are suitably journaled in the housing 11 to rotate on bearing assemblies 21, 23, 25, 27. An endless motion transmitting member as, for example, a chain 29 connects or passes around pulleys 13, 15 and provides a traction transmission between them. The chain 29 is kept tensioned by a pair of tension rollers 31, 33 which are held against the outer flat surfaces of the chain links. Each tension roller rotates on its axle 35, 37, with the axle ends respectively mounted in links 39, 41, 43, 45. The links in turn are fixed to the ends of curved arms 47, 49, 51, 53 which are pivotally supported by pins 59 from brackets 55, 57 mounted in housing 11. Arms 47, 49, 51, 53 are curved to clear the pulleys and their related componentry. Tension rollers 31 and 33 can thus swing to any new position required due to drive ratio and load changes as will be described more fully hereinafter. The length of the chain 29 is of course predetermined or fixed of such length as to provide at no load, a predetermined amount of sag on each side. For example, in one model, there has been provided one inch sag on each side.

Figure 6:
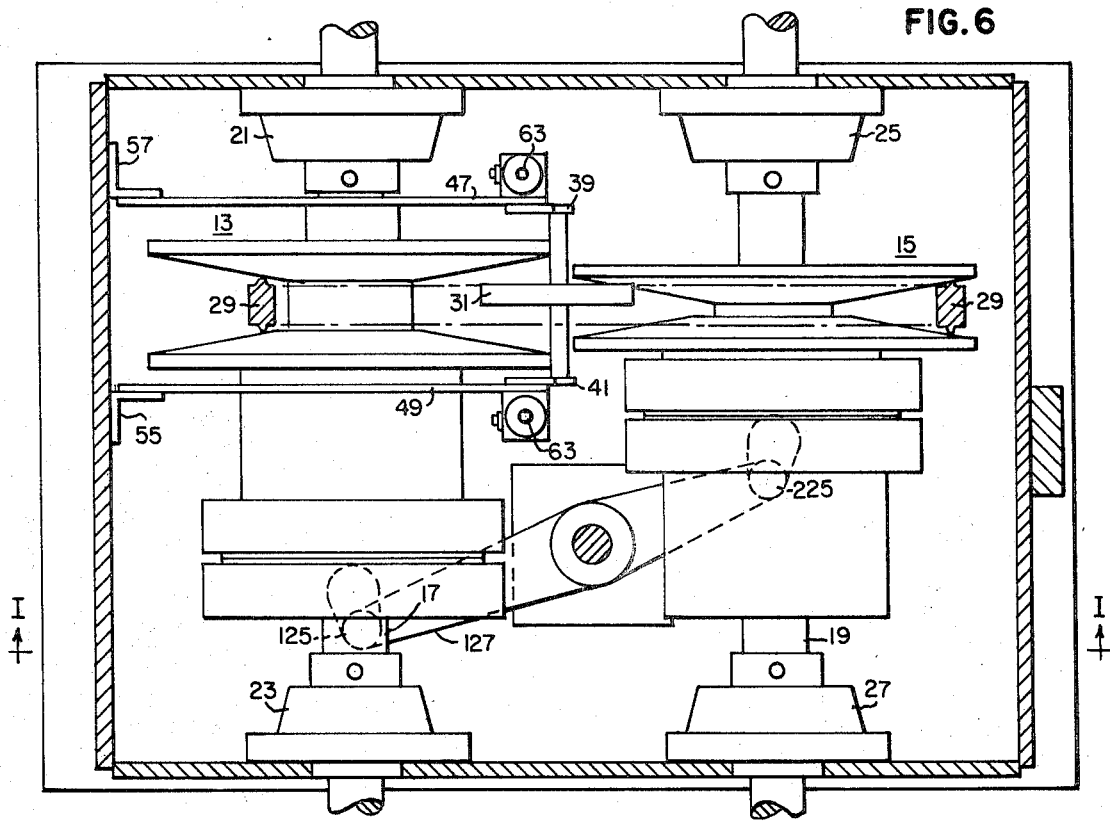
FIG. 6 is a partly sectionalized top view, with the upper part of the housing removed, of the drive shown in FIG. 5.
Figure 11:
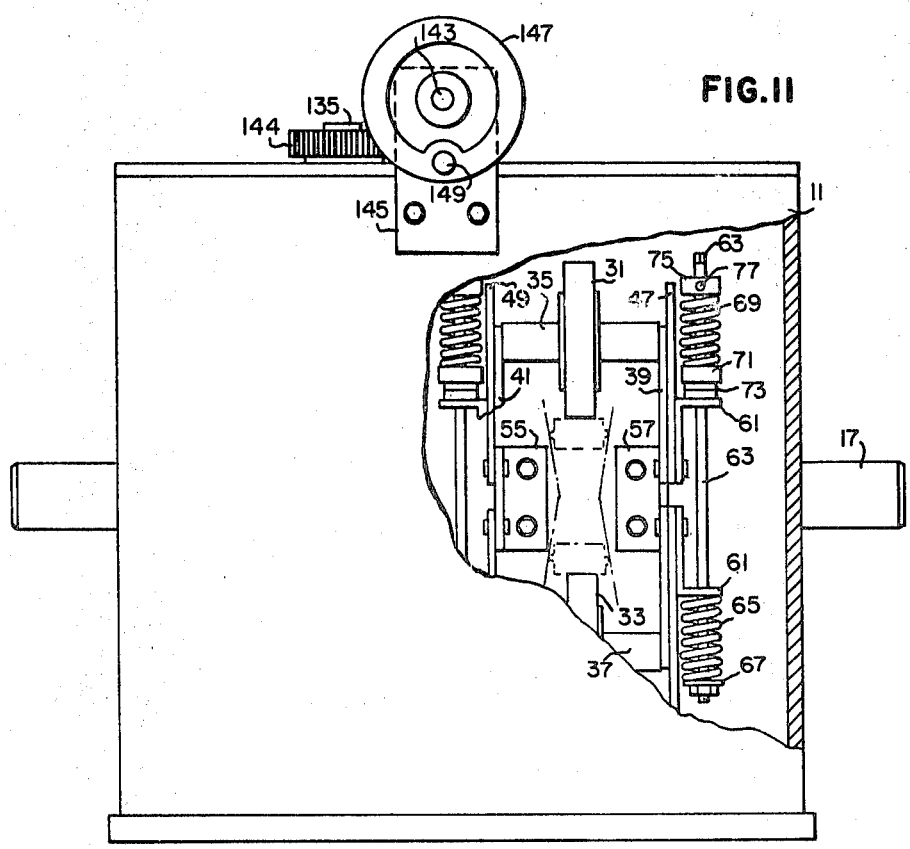
FIG. 11 is a detailed view of the tension roller components of apparatus according to the invention.

The chain would be loose or sag on pulleys 13, 15 were it not for tension means, shown as rollers 31, 33, bearing on the chain outer surfaces at points about midway between the pulleys. To provide the tensioning force, means is provided for biasing the rollers 31, 33 toward each other and against the chain. In the embodiment of FIGS. 1, 5 and 6, each of oppositely disposed pairs of curved arms are provided with angle brackets 61 which are adapted to hold threaded tie rods 63. A compressible spring 65 is provided at one end of each tie rod 63, being arranged for compression between a tie rod flange 67 and angle bracket 61. The opposite end of each tie rod is provided with a torsional self-adjustment assembly comprising a torsion spring 69 arranged to turn a torsion nut 71 against a thrust bearing 73 mounted between the torsion nut and an angle bracket 61. The torsion spring is wound to the desired extent by a loading nut 75 which is then locked to tie rod 63 by any suitable mechanical expedient such as, for example, a set screw 77. For any given setting of the loading nut 75 the torsion spring will rotate the torsion nut 71 and draw up the tie rod until its force is offset by reaction of the compressible spring 65. Adjusting the torsion springs thus adjusts the force applied to the torsion rollers 31, 33 bearing on chain 29. The torsion assembly also adjust the applied tension automatically as chain slack or loosening occurs due to wear of the parts.

There are several functions performed by the tension rollers arrangement and the related compression and torsion spring assemblies in the manner in which said rollers exert holding force on the chain approximately midway between respective chain-pulley contact points. One important function is the maintenance and assurance of greater pulley wrap than would otherwise be possible. A large wrap angle is desirable towards decreasing slack side chain tension requirements and increasing the total number of chain-pulley contacts on each pulley. Wrap angle is defined in the art as the included angle of pulley in contact with chain. The wrap is automatically 180° on whichever pulley is the larger. The tensioning rollers are positioned to assure a minimum wrap of approximately 180° on whichever pulley is the smaller at any given time. Thus, about 180° or more of wrap may be obtained on each pulley.

Also, because they are resiliently mounted rather than rigidly mounted, the tension rollers permit smooth disengagement and engagement of chain contact points with pulley contact points and thus reduce the tendency of the chain to spin or twist in operation.

The pivotal or pinned assembly of the chain tensioning system permits the tension rollers to "float" or position themselves on the chain as varying conditions obtain. For any given drive ratio position when the chain is not pulling load, minimum roller tension is needed for chain control and the tension rollers will assume a position similar to that illustrated in the drawings by the solid lines of FIG. 3 or as shown in FIG. 5 for example. When the drive is loaded, the chain pull on one side, called the tight side, is increased, tending to move the tension roller on that side outward from its no-load position (See FIG. 3). At the same time, the slack side roller moves inward from its no-load position but not as far as the other roller moves outward as shown in FIG. 3. The difference in the tension roller movements between the pull or tight side and slack side of the chain is accompanied by increased compression of the springs 65, 69 which, in turn increases the force exerted by the tension rollers against the chain. To maintain constant slack side tension as more slack accumulates with load increases, more roller force is required on that side as the angle at which slack chain bears against the roller increases. It is, therefore, possible with the above-described means to control the chain slack side tension by proper selection of the springs 65, 69. The spring design may be effected to produce constant chain tension or increased chain tension as load is increased and thus provide for control of the chain slack side pull to tight side pull under all load conditions. By arranging spring 65 to go solid at a predetermined point of shaft p/p value, this value remains constant regardless of load and guarantees safety. Thus there is provided load responsive tension on the chain during startup and lightly loaded conditions of the drive and a predetermined tension on both tight and slack portions beyond a predetermined load so that the p/p ratio is limited to a predetermined value under all other load conditions during operation of the drive. Control of this chain pull ratio is an important design consideration because slack side tension in excess of actual requirements adds to the pull on both chain sides, increasing pulley shaft bearing requirements and adding to chain pivot wear. Excessive slack side tension also increases the spin tendency of the chain because of the unnecessarily increased chain-to-pulley contact forces.

Referring to the drawings, it should also be noted that the compression and torsion spring assemblies apply their force approximately in a straight line between the roller axles, thus subjecting the curved arms and their mounting elements to only minimal resultant loading. This is in effect a further force balancing feature which obviates undue stresses on the working elements and housing and fittings of the apparatus of this invention.

A typical chain 29 as shown in the detail of FIG. 7 may be made up of a paralleled multiplicity of identical links 79 having traction contact surfaces 81 on outer surfaces of projections 83. In the chain shown, a cylindrical projection 85 at one end of a link fits into a hole 87 at the opposite end of an adjacent link repeatedly until a half chain width is completed. A second half chain width is similarly completed and the two half widths assembled and fastened together through holes in the abutting cylindrical projections by means of roll pins 89. With such a chain design the maximum interlink pivot diameter is obtained without sacrificing any possible traction contact area. With the chain assembled the longitudinally extending, flat lands 83 are on respective outboard sides of the chain and one of the contact surfaces 81 on the land 83 of the chain so that the chain can be closed from either direction in assembly. The lands are disposed between the joints of the links, whereby spin is avoided in the contact area which would occur if the contact were at the chain joint, or pin, due to rotation as the chain starts around the pulley flange.

The angle of the surfaces 81 is matched to the pulley face constant angle as noted hereinbefore. Contact pressure must be sufficient to produce a safe traction coefficient. Since such a coefficient decreases rapidly at low pressure, a small area of contact is required. If such an area is to be controlled and located where desired, it must substantially match the flange surface. It follows that the flange cannot be curved but must have a constant flange angle. This is because the contact pressure is large and fatigue and brinelling result if the radius of curvature is small, whereas if the radius is large, the contact increases on increases of loads, and velocity and spin factors increase losses and wear. The same result follows if the contact area is not longitudinally extending, i.e., if the contact area is wide radially of the flange or crosswise of the chain.

It is also possible to make a chain with contact surfaces 81 on each side of the chain parallel to each other and not matching the pulley face angles. It is found that these narrow parallel areas, even though hardened, can be deformed by heavy rolling action after assembly into chains to conform to the requisite pulley face angle. In some instances this method of roll-sizing the chains may be preferred. In order to minimize the chain spin tendency, the width of the chain contact surfaces should be kept as small as possible and velocity differences between the chain contact surfaces and pulley contact surfaces eliminated insofar as possible, by keeping the chain contact surfaces at the longitudinal centerline of the chain or as nearly as possible thereto, thus avoiding velocity changes of the lands relative to the pulley flanges which would otherwise occur.

The use of symmetrical links produces a chain with contact areas on each side parallel to each other but which do not match the pulley wedge angle. It is contemplated that these narrow areas or lands, even though hardened, can be deformed by heavy rolling action, after assembly into chains, to conform to the wedge angle. Chain so roll sized is very uniform, minor manufacturing tolerances are largely eliminated, and better surface control is possible than with grinding.

From the drawings it can be seen that the outer surface of the chain 29 is essentially flat to provide a substantially continuous rolling surface for the tension rollers.

Once a chain of the type shown in FIG. 7 is assembled, it is very difficult to replace individual links. Many consecutive roll pins must be removed before sufficient play is obtained to permit release of a link. This is considered to be a highly desirable feature, as persons skilled in the art will appreciate, because after long service in normal wear it is dangerous to insert new unworn links in an old chain. When a traction chain wears or breaks on overload, it should be replaced, not repaired.

Other configurations of chain design are of course possible and it is not intended to limit the invention by any particular chain design. As a matter of fact, chains are not essential and suitable forms of belts may suffice in some cases. The essential elements are the presence of an outer surface adapted for substantially continuous engagement with the tension providing means, preferably rollers as illustrated, and a multiplicity of regularly spaced traction surfaces on each side for traction engagement with the adjacent pulley faces. As a practical matter, however, it will be found that any traction member to work advantageously with this invention must have most of the features of the chain described.

There are illustrated in the drawings several other chain designs.

Figure 12:
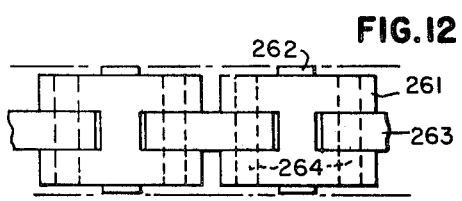
FIGS. 12, 13 and 14 show several alternative chain and chain link designs.

In FIG. 12, there is provided a chain comprising H-shaped members 261 having suitable lands 262, rectangular members 263, and assembly pins 264.

Figure 13:
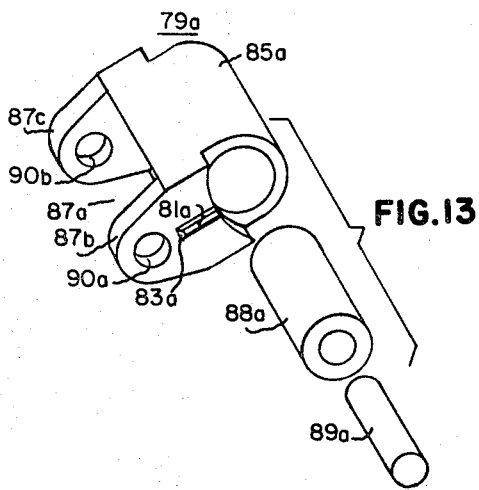
Figure 14:
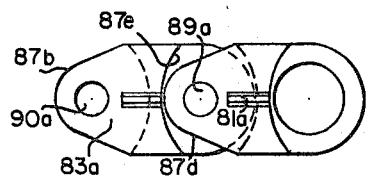

In FIGS. 13 and 14 there are illustrated identical links 79a having traction contact surfaces 81a on outer surfaces of projection 83. A cylindrical projection 85a at one end of a link is inserted into opening 87a between wings 87b, 87c projecting from link 79a. An opening through projection 85a receives cylindrical member 88a of length equal to the width of projection 85a. Member 88a has an opening for receipt of a pin 89a which also extends through openings 90a, 90b in wings 87b, 87c by means of a press fit. As shown in FIG. 14, there results a chain having a substantially continuous surface on the outer surface of the chain with short, regularly spaced traction surfaces 81a along the longitudinal axis of the chain. The links are free for limited pivotal movement about pins 89a. The arc 87e of the links has a greater radius of curvature than that of surface 87d of wings 87b, 87c.

FIGS. 6, 8, 9, and 10 illustrate the features of the variable pitch pulleys used in illustrated embodiment of the invention. Each pulley comprises two main flanges with constant angle traction faces in opposed relationship to define a wedge angle in which the chain moves while transmitting traction force in the operation of the drive. Each pulley has one fixed flange and one movable flange and the pair of pulleys in any one drive is arranged and controlled so that the pulley wedge angle of one of the pulleys widens at the same time (and as a result of the same control motion) as the wedge angle on the other pulley narrows. The distance between the traction faces of a pulley determines the position assumed by the drive chain and control of the drive ratio is thus obtained by simultaneously varying the widths of the wedge angles in a pair of pulleys comprised in any given drive according to the present invention.

When two adjustable pitch pulleys are connected by chain, it is found that the chain length required is not constant when the pulley sides are adjusted equal distances axially. The chain length may be calculated using the equation:

$$\text{Chain length} = 2\sqrt{c^2 + 4s} + \frac{\pi}{2}(D+d) + \frac{(D-d)^2}{4c^2}$$

where $c$ is the distance between pulley centerlines, $D$ and $d$ are the two pulley diameters, and $s$ is the desired amount of sag. When $D$ equals $d$ (1 to 1 ratio), the minimum chain length is established since the factor $$\frac{(D-d)^2}{4c^2}$$

drops out. The greater the difference between $D$ and $d$ the larger this factor is, adding to the required length of the chain. A chain which is just long enough at extreme ratio position has a great amount of sag or slack at 1 to 1 ratio.

FIGS. 8, 9, and 10 illustrate typical pulley constructions. In the case of pulley 13, an outer flange 91 is formed integrally on an elongate sleeve 93 fitted on the shaft 17 and fixedly attached thereto by a set screw 94. An inner flange 95 is formed integrally with another larger sleeve 97 which fits concentrically slideably over the sleeve 93 so that a constant angle traction face 99 on flange 91 is oriented opposite a constant angle traction face 101 on flange 95 to define the wedge angle as shown. The sleeve 93 is provided with at least one axially extending slot 103 which engages a control roller 105. The outer sleeve 97 (for the inner flange) is provided with two slots which intersect as shown in FIG. 8 to define an L-shaped slot arrangement. One of these slots, 107, extends more in an axial direction than circumferential and the other 109, can be seen to extend more in a circumferential direction than axially. The longer relatively axially extending slot 107 is engaged by another control roller 111 mounted on the same pivot pin 113 as roller 105 and the shorter relatively circumferentially extending slot 109 is engaged by still another control roller 115 mounted on a pivot pin 117 projecting radially from the inner sleeve 93. Pin 113, which provides the pivotal mounting for the control rollers 105 and 111, extends radially inward from a collar 119 which moves rotatably with the pulley assembly but is free to slide axially on sleeve 97. A second collar 121 fits slideably on sleeve 97 and is arranged to stay fixed as to rotation but also moves axially so as to push collar 119 axially. Suitable bearings, for example, needle bearings 123, are provided between collars 119 and 121 to facilitate relative rotational movement involved. Collar 121 is provided with an outward radially extending pin 125 which engages a control arm 127 arranged to move about a pivot 129. As the control arm 127 is moved to push collar 121 against collar 119, the control rollers 105 and 111 move axially towards the pulley flanges. Roller 105 moves as a guide in the axially extending slot 103 in sleeve 93. Roller 111 effects a camming action on the walls of slot 107 and causes the sleeve 97 and related pulley flange 95 to rotate relative to the sleeve 93 and flange 91. The rotative action effects a camming action of roller 115 on the walls of the relatively circumferentially disposed slot 109 in sleeve 97 an causes flange 95 to move towards flange 91, narrowing the space between the pulley faces to give the pulley an effectively greater diameter.

In the case of pulley 15 (See FIG. 10), an outer flange 191 is formed integrally on an elongate sleeve 193 which is slideably fitted on the shaft 19, but is not fixedly attached thereto. An inner flange 195 is formed integrally with a larger or outer sleeve 197 which fits concentrically over sleeve 193 and is fixedly attached to the shaft 19 by means of a set screw 198 or the like. In this manner, a constant angle traction face 199 on flange 191 is oriented opposite a constant angle traction face 201 on flange 195 to define a wedge angle identical to that formed by the constant angle traction faces of the flanges of pulley 13. Inner sleeve 193 is provided with at least one axially extending slot 203 which engages a controller roller 205. The outer sleeve 197 (for the inner flange 195) is provided with two slots 207, 209 which intersect to define an L-shaped slot arrangement similar to the arrangement shown for the 107, 109 slots in FIG. 8. The longer relatively axially extending slot 207 is engaged by a control roller 211 mounted on the same pivot pin 213 as roller 205 and the shorter relatively circumferentially extending slot 209 is engaged by a control roller 215 mounted on a pivot pin 217 projecting radially from inner sleeve 193. Pin 213, which provides the pivotal mounting for the control rollers 205 and 211, extends radially inward from a collar 219 which moves rotatably with the pulley assembly but is free to slide axially on sleeve 197. A second collar 221 fits slideably on sleeve 197 and is arranged to stay fixed as to rotation but moves axially so as to push collar 219 axially. Needle bearings 223 are provided between collars 219 and 221 to facilitate relative rotational movement. Collar 221 is provided with an outward radially extending pin 225 which engages control arm 127 at the end opposite the end which engages pin 125 in the pulley 13 assembly. As the control arm 127 is moved to push collar 221 against collar 219, the control rollers 205 and 211 move axially toward the pulley flanges. Roller 211 moves as a guide in slot 207 in sleeve 197, while roller 205 effects a camming action on the walls of slot 203 and causes the sleeve 193 and related pulley flange 191 to rotate relative to the sleeve 197 and flange 195. This rotative action effects a camming action of roller 215 on the walls of the relatively circumferentially disposed slot 209 in sleeve 197 and causes flange 191 to be moved inward towards flange 195, narrowing wedge angle to give the pulley 15 an effectively greater diameter.

In each drive, the pulleys are operated in paris, and an applied control force tending to increase the diameter (narrow the wedge angle) of one pulley is accompanied by a release of control collar pressure against the slots, rollers, etc. of the other pulley, permitting the drive chain contact force thrust to widen that other pulley's wedge angle and decrease its effective diameter. It is also possible and advantageous to provide control biasing means such as a spring 133, 233 compressed between a collar 131, 231 attached to the shaft 17, 19 and the movable sleeve 97, 193 of the pulley. Such springs are useful in providing control reaction forces when desired and they also assist in compensating for unbalanced pulley flange thrust loads.

From the foregoing description and the drawings, particularly FIG. 8, it can now be seen that both the angle from the axial and the curvature of the outer sleeve slots such as 107 and 207, can control the amount of pulley flange movement relative to control collar movement. By particular design in any given drive, the curvature and/or axial angles of the axially extending slots such as 107, 207 may be matched to compensate exactly for chain length variation tendencies in operation. Examination of FIG. 8, will also show that thrust load on the outer pulley flange traction face 99 due to chain contact forces is transferred through the roller 115 engaging the relatively circumferentially extending slot 109 to the inner pulley flange traction face 101. The extent to which chain contact thrust forces are transmitted to the control collar depends upon the relative collar travel distance to pulley flange travel distance and can be made quite small, if required, by varying the relative angles and/or respective curvatures of the L-shaped slot arrangement. Force balances are thus effected almost entirely within the pulley componentry and the shaft bearings are subjected to only minimal thrust loading.

It should be noted that in a given drive, the two sets of pulley components are identical, the only difference being the fixing of one pulley's outer flange to the shaft and the other pulley's inner flange to the shaft, the collar control movement, as between the pulleys, is not the same. This is because the outer sleeve and inner flange move in the same direction as the control collar on the pulley with the inner sleeve and outer flange fixed to the shaft, but on the pulley with the outer sleeve and inner flange fixed to the shaft, the inner sleeve and outer flange move in a direction opposite to the control collar movement direction. For correct ratio control of both pulleys with one control arm (or two oriented the same as will be hereinafter described), it is necessary to locate the control arm pivot closer towards the pulley with the smallest control arm movement by an amount sufficient to compensate for the control movement difference obtaining between the pulleys. The control arm pivot displacement also compensates for the difference in thrust forces against the control collars for the pair of pulleys in a given drive and thus makes for equalization of the torque forces applied to the control arm pivot through the two sections of the arm.

In drives where, for one reason or another, the two sets of pulley components, slots, etc. are not identical, but are designed towards compatible operation with a given chain, it is possible to locate the control arm pivot exactly midway between the drive and driven shafts.

The foregoing description of the control elements and mode has been made with respect to a unitary control parts train of pins, collars, slots, rollers, sleeves, flanges, etc. for each of the pulleys in the drive, while reference to the drawings shows duplicate control features for each of the pulleys, In the illustrated embodiment, as can be seen for instance from FIG. 5, each of the pulleys is provided with duplicate control componentry as described above. The various slots, rollers, etc. are provided twice on each pulley and arranged in diametrically opposite positions on each pulley. The second control train sets are also operated in unison by a single control arm 227 which turns on pivot 229. Pivot points for the control arms lie on the axis of a control shaft 135, shown in FIG. 5, with extends exteriorly of drive housing 11 and is mounted rotatably therein by bearings 137 and 139. The control shaft 135 is provided at its end exteriorly of housing 11 with a gear 141, driven from a worm on an actuating shaft 143 mounted on the exterior of the housing in brackets 145. The actuating shaft may be provided with a handwheel 147 and crank 149, and, as conditions require, with suitable setting lock mechanism. To vary the drive ratio in operation, the operator turns handwheel 147 to rotate actuating shaft 143. The worm on 143 in turn rotates gear 141 and the control shaft 135, causing the control arms 127, 227 to move a collar 121 on one pulley and 221 on the other pulley in opposite directions, effecting the narrowing of one pulley wedge angle and the simultaneous widening of the other.

Drives according to the present invention may be made with many modifications. Materials used in construction of these drives include low carbon steels for the chains and pulleys, cast iron for pulleys, metal castings and/or plates for the housing, brackets, etc., and metal and/or plastic or suitably tired discs for the tension rollers. In a typical drive for general industrial application, two 7¾ inch O.D. pulleys are sued. It is also possible to use pulleys having different diameters in the same drive. In a completed drive, the housing is filed with an suitable commercially available traction drive lubricant.

In the light of the foregoing detailed description of the present invention, numerous alternative constructions and features will doubtless occur to persons skilled in the mechanical arts. This is true particularly with respect to the control mode. It is entirely possible, for instance to employ a hydraulic, pneumatic, or an electrical system, or a combination of these, to effect the simultaneous movement in opposite directions of the collars 121, 221. For these reasons, the description of the invention presented here should be considered only as illustrative and not in any limiting sense, it being intended to limit the invention by the appended claims.

In FIGS. 15 and 16 there is shown a different embodiment of tensioning means. This arrangement uses post guides and provides an improved balance of forces and greater stability. There is shown a roller assembly comprising a pair of rollers 270, 271 engaging chain 272. The rollers shown are carried by suitable cross-shafts 273, 274 and may include tires 275 of suitable material, such as urethane, for example. The cross-shaft 273 is carried from one end of links or arms 276, 277 and shaft 274 is carried from one end of links or arms 278, 279.

The roller assemblies are mounted on post guides 280, 281 which are suitably mounted vertically upon a support or within a housing. The upper assembly including roller 270 is pivotally supported from the sleeves 282, 283 as indicated at 284 and 285 and the lower assembly including roller 271 is pivotally carried by sleeves 286, 287 as indicated by numerals 288 and 289.

Means is provided for biasing sleeves 282, 283 toward sleeves 286, 287. Sleeves 283 and 287 have vertically extending bores 290, 291 through which guide 281 extends in slidable relation. A rod 292 slidably extends through suitable bore 293, in offset portion 294 of sleeve 283 and into threaded engagement with threaded bore 295 in the offset portion 294a of sleeve 287. In order to bias the sleeves toward each other, a load spring 296 is placed around rod 292 between portion 294 and nuts 297. The arrangement, of course, applies the desired tension to chain 272.

In order to limit the ratio of $Ps/Pt$ to a safe value, there is provided on each guide a member operable in one direction such as a one-way nut. Referring to FIG. 16, the portion 294 is provided with a chamber 298. Within this chamber and encircling rod 292 is one-way nut 299. A plurality of balls 300 is pushed down the hardened taper of the nut by means such as wave spring 301 to grip the hardened shank of the spring post or rod 292. Bias springs 302 are provided to resist shaking the one-way nuts down the rod under conditions of vibration. With wear, increased sag permits the roller assemblies to come closer together whereupon the relatively heavy load springs slide the nuts down the rods. However, when the roller assemblies separate with increased load, the one-way nuts hit bottom after a predetermined movement and no further roller separation can take place.

In one assembly utilizing the guide post embodiment, the chain was set up with an initial sag of 1 inch on each side of the pulleys at no load. As torque is applied and as a pull is introduced on the chain, the ratio $Ps/Pt$, which starts at 1 becomes increasingly large which tends to separate the rollers and sleeves whereby the load springs are compressed. Slack tension or pull decreases slightly at first and then builds up but remains essentially constant. Tight side pull continues to increase, however, as load is applied. With the unit illustrated in FIGS. 1—6 and 11, the springs and preload were selected so that the spring 65 went solid at $Ps/Pt$ of about 5. Greater loads cannot affect chain sag values or $Ps/Pt$ so that the chain cannot be made to slip under heavier loads. This condition occurred when the tight side sag was about one-fourth inch and the slack side was 1⅜ inches, there being an additional spring deflection of three-eighths inch. With chain lengthening under wear, the initial sag is greater and the load springs are under less compression. $Ps/Pt$ increases faster and may become unsafe before the springs go solid. By suitably limiting the addition spring compression due to load, $Ps/Pt$ can be kept within safe limits by sue of the one-way nut arrangement.

I claim:

1. A power transmission drive comprising in combination, a pair of shafts arranged in parallel relationship; a pulley on each of said shafts; an endless traction transmitting member connecting said pulleys, the length of said member being such as to provide a predetermined amount of sag between said pulleys under no load conditions, means for providing load-responsive tension on said member during startup and lightly loaded conditions of said drive and means for providing a predetermined tension on both slack and tight sides of said member beyond a predetermined load including means for limiting the ratio of slack-side-sag to tight-side-sag to a predetermined value during operation of said drive, and means for limiting the ratio of slack-side-sag to tight-side-sag to a predetermined value during operation of said drive.

2. The power transmission drive of claim 1 in which there is provided a member operable in one direction and said providing means comprising a torsion spring normally fully compressed and which tends to rotate said operable member for causing one of said pulleys to engage one side of said member and a compression spring having available limited movement under no load conditions for causing another of said pulleys to engage to other side of said member.

3. The drive of claim 2 provided with means whereby said compression spring goes solid under appreciable load conditions whereby the ratio of tight side tension to slack side tension is limited to a predetermined value.

4. The drive of claim 1 in which the limiting means comprises a spring for preloading said member under no-load and light-load conditions, and means including a member operable in one direction to limit separation of opposite sides of said member under any appreciable load.

5. The drive of claim 1 in which the length of said member is sufficient to provide a minimum wrap of approximately 180° on each of said pulleys.

6. The drive of claim 1 in which each pulley is of adjustable pitch with respect to the other.

7. The drive of claim 1 wherein said pulleys are of adjustable pitch and there is provided pitch controller means, means utilizing said pitch controller means for changing the pitch of each pulley, said pitch controller means being arranged and disposed simultaneously to increase pitch on one pulley and decrease pitch on the other pulley.

8. The drive of claim 7 provided with a housing and wherein each pulley has on e flange relatively fixed rotationally and axially with respect to its shaft and another flange movable axially with respect to its shaft and the relatively fixed flange; said pitch changing means comprising first pulley pitch changing means adapted selectively to move one of said movable flanges axially and pulley pitch changing control means being operably connected to the first and second pulley pitch changing means and arranged to move the first pulley pitch changing means and the second pulley pitch changing means simultaneously in opposite directions; said endless traction member having traction surfaces disposed to transmit traction forces to and from traction surfaces on the pulley flanges; said tension providing means comprising a pair of traction member tensioning rollers bearing rotatably on the outer peripheral surfaces of the traction member at points between the pulleys; tensioning roller mounting means guided by means pivotally connected to the housing; and resilient tensioning connection means between the roller mounting means for each respective roller, arranged and disposed to urge the rollers towards each other with one of the pair bearing on the outer peripheral surface of a member which is in tension and the other of the pair bearing on the outer peripheral surface of a member side which is in slack.

9. A drive according to claim 1 wherein said tensioning means comprises a pair of tensioning rollers bearing rotatably on the outer peripheral surfaces of the traction member at points between the pulleys, tensioning roller mounting means for each roller and resilient connection means between the tensioning roller mounting means arranged and disposed to urge the tensioning rollers towards each other with one of the pair bearing on the outer peripheral surface of a portion of the member which, during operation of the drive, is in tension and the other of the pair bearing on the outer peripheral surface of a portion of the member which, during operation of the drive is slack.

10. A drive according to claim 1 in which each pulley comprises a first pulley flange member relatively fixed rotationally and axially with respect to a shaft of the drive, having an attached elongate sleeve; a second pulley flange member relatively movable axially with respect to the first pulley flange member and its shaft, having an attached elongate sleeve concentrically disposed with respect to the elongate sleeve of the first pulley flange member; camming means on said sleeves, and ratio control means comprising an arm operatively associated with said camming means, said ratio arranged to provide a relatively short axial movement of said second pulley flange member in response to a relatively long movement of the drive ratio control means.

11. The drive of claim 1 in which the traction transmitting member has an outer surface adapted for substantially continuous engagement with said tension providing means, and has a multiplicity of regularly spaced traction surfaces on each side thereof for traction engagement with the adjacent faces of said pulleys.

12. The drive of claim 11 in which said traction surfaces are disposed substantially along the longitudinal centerline of said traction transmitting member.

13. The drive of claim 11 in which said traction surfaces are longitudinally extending land surfaces disposed on both sides of said member for transmitting traction forces to said pulleys.

14. The drive of claim 11 in which the area of said traction surfaces is so chosen as to maintain a coefficient of traction sufficient to avoid slip at any anticipated load.

15. The drive of claim 11 in which the areas of said traction surfaces are such that the relationship between the coefficient of friction and the maximum contact pressure falls within the area designated A in the graph of FIG. 4 of the drawings.

16. In the drive of claim 1, a traction member comprising, in combination a multiplicity of chain links, each link being of substantially rectangular cross section in the direction of chain movement and having a traction surface on at least one side thereof; a laterally disposed substantially cylindrical connection protrusion at one end and a laterally disposed substantially cylindrical connection hole at the other end; and a multiplicity of roll pins connecting said links assembled with the connection protrusions fitted in each instance into the connection holes of adjacent links.

17. In a traction drive member according to claim 16, the improvement comprising a chain link of generally rectangular cross section, having a traction surface on each side thereof, a laterally disposed substantially cylindrical connection protrusion at one end and a laterally disposed substantially cylindrical connection hole at the other end, said connection hole being arranged to be assembled with a connection protrusion of an adjacent link of said chain.

18. The drive of claim 1 in which the length of the member is determined by the formula length equals $$2\sqrt{c^2+4s^2}+\frac{\pi}{2}(D+d)+\frac{(D-d)^2}{4c^2}$$

wherein $c$ is the distance between pulley centerlines, $D$ and $d$ are the pulley diameters and $s$ is the desired amount of sag.